United States Patent
Jenkins

(10) Patent No.: US 6,961,707 B2
(45) Date of Patent: Nov. 1, 2005

(54) INTERACTIVE SELF-STORAGE RENTAL SYSTEM AND METHOD

(75) Inventor: Lawrence A. Jenkins, Monona, WI (US)

(73) Assignee: Trachte Building Systems, Inc., Sun Prairie, WI (US)

(*) Notice: Subject to any disclaimer, the term of this patent is extended or adjusted under 35 U.S.C. 154(b) by 0 days.

(21) Appl. No.: 09/879,235

(22) Filed: Jun. 11, 2001

(65) Prior Publication Data

US 2002/0188457 A1 Dec. 12, 2002

(51) Int. Cl.[7] .............................................. G06F 17/00
(52) U.S. Cl. ................................ 705/5; 705/1; 705/80
(58) Field of Search ........................ 705/5, 1, 6, 26.4, 705/15, 27, 64; 348/231.3; 702/184; 235/375, 376; 708/142, 144

(56) References Cited

U.S. PATENT DOCUMENTS

| | | | |
|---|---|---|---|
| 4,965,821 A | 10/1990 | Bishop et al. | |
| 5,247,160 A | 9/1993 | Zicker | |
| 5,724,261 A | * 3/1998 | Denny et al. | ................ 364/550 |
| 5,946,660 A | * 8/1999 | McCarty et al. | ................ 705/5 |
| 6,347,302 B1 | * 2/2002 | Joao | ................ 705/4 |

FOREIGN PATENT DOCUMENTS

JP  407141431 A  *  6/1995

OTHER PUBLICATIONS

IBM Technical Disclosure Bulletin; Jan. 2001; Issue No. 441. Rental Network Storage Business combined with user assist utility.*

* cited by examiner

Primary Examiner—Elisca Pierre Eddy
(74) Attorney, Agent, or Firm—Michael Best & Friedrich LLP

(57) ABSTRACT

A method and system for facilitating rental of self-storage rental units is operative to establish interactive communication between a potential customer located at a rental site service area and a remote manager who can recommend one or more storage units that meet the customer's size needs and time availability. The manager can direct the customer through a security gate to specific storage units for inspection, and guide the customer in completing a rental agreement for a selected storage unit at the customer service area. Telephonic communication between the customer and the remote manager is established via a public switch telephone network. The remote manager can provide instructions and answer questions while observing the customer's movements, and can verify information inserted on the rental agreement through strategically placed cameras within the customer service area. Security cameras enable the remote manager to observe the rental unit site.

18 Claims, 10 Drawing Sheets

INTERACTIVE SELF-STORAGE RENTAL SYSTEM AND METHOD

BACKGROUND OF THE INVENTION

1. Field of the Invention

This invention relates generally to storage systems, and more particularly to interactive self-storage rental systems.

2. Related Art

A self-storage facility is a term generally applied to businesses that offer storage space for rent, usually on a month to month or other limited time period. Typically, a self-storage facility includes a number of individual storage spaces or cubicles that may be separated from each other by common walls and have separate entrances. The storage spaces are generally rented to individual customers or business entities for the purpose of storing personal property. For example, a home owner changing homes may wish to temporarily store personal items, such as a t.v., sofa, and other household items, in a storage facility before moving into a new home. Customers may also use a self-storage facility to store accumulated possessions over an extended period of time. In essence, self-storage facilities provide the extra storage space that customers require over and above the storage capacity of their primary living facility.

A key component of known self-storage facilities is a manager who is generally on-site and answers questions of prospective renters, personally shows the prospective renters available storage units, enters into rental agreements regarding the self-storage facility, and either directly or through strategically positioned cameras monitors and polices the premises. In this manner, the manager provides direct on-site customer services for the self-storage facility.

If, however, the on-site manager is unavailable, the customer may not wish to wait for service and will decide not to rent a storage unit from that particular facility. Thus, a rental opportunity will be lost. Further, requiring a manager to be present at each self-storage rental facility by a concern operating a number of different self-storage facilities adds greatly to the cost of operations.

Accordingly, a need exists for an improved self-storage rental system and method of operation that is less labor intensive and particularly adapted for use by persons lacking an aptitude for or interest in technical knowledge and skills ordinarily associated with computerized and/or automatic systems, thus resulting in improved efficiency and reduced costs of operation.

SUMMARY OF THE INVENTION

In accordance with a preferred embodiment of the invention, a method and system for facilitating rental of self-storage units are provided that is responsive to a customer entering a service area to automatically establish communication between the customer and a remote manager or coordinator using a communication link, such as a telephone, Internet, radio, cellular, facsimile, satellite, email, web or video connection. The system allows the remote manager to obtain information from the customer relating to the customer's storage needs, and to then recommend one or more available storage units. The remote manager can control passage of the customer through a gate to enable inspection of the recommended storage units while observing the customer through selectively positioned cameras/monitors. The service area includes a counter on which a rental agreement can be placed under the direction of the remote manager for completion by the customer if a self-storage unit is found acceptable. The counter also receives personal identifying and credit information from the customer. Strategically placed cameras enable the remote manager to review information placed on the rental agreement by the customer to verify that the rental agreement is fully and legibly completed, to review and compare the identifying and credit documents presented by the customer with visual observation of the customer and to confirm deposit of the completed rental agreement and payment in a deposit slot for later retrieving. The customer service area preferably contains a cabinet having accessories therein, such as a lock for securing the rented self-storage unit, that is controlled and observed by the remote manager for access by the customer if wishing to purchase a lock. The manager can observe and verify the customer's payment when placed on the counter. In an illustrated embodiment, communication between the prospective customer and remote manager or coordinator is established via a public switch telephone (PSTN) and performed by telephone conversation. Thus, the system does not require any knowledge or skill related to computer use or other new technology on the part of the prospective customer. A feature of the invention is that the customer service area allows control of access to system usage.

Other features and advantages of the invention will become apparent to those skilled in the art from the following drawing figures and detailed description. It is intended that all such additional features and advantages be included within the scope of the invention, and be protected by the accompanying claims.

BRIEF DESCRIPTION OF THE DRAWINGS

In the figures, like reference numerals designate like elements throughout the several views.

DETAILED DESCRIPTION

Figure 1:
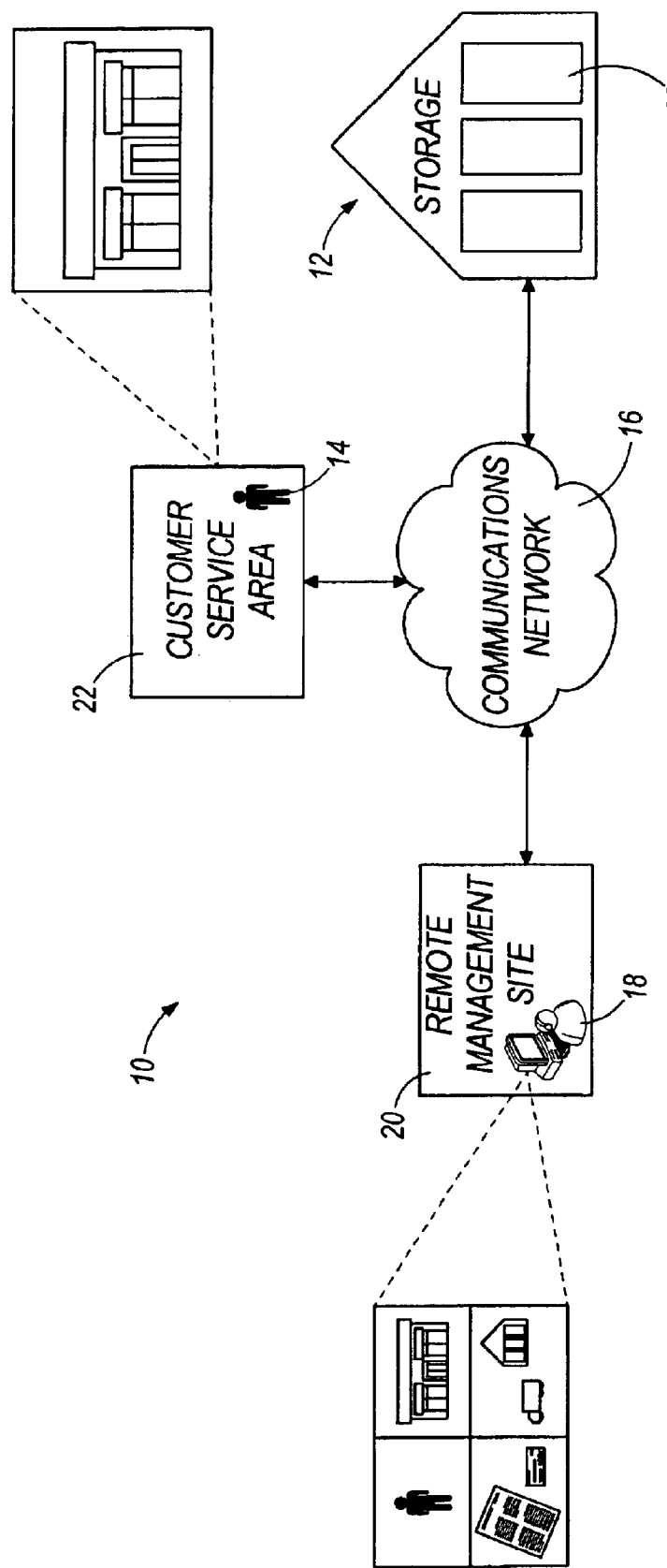
FIG. 1 is a block diagram schematically illustrating an interactive self-storage rental system in accordance with one embodiment of the present invention.

Referring to the drawings, FIG. 1 schematically depicts an interactive self-storage rental system, indicated generally at 10, in accordance with one embodiment of the present invention. The system 10, which may alternatively be referred to as a self-storage facility, typically includes a plurality of rentable self-storage units, indicated collectively at 12, by prospective customers, also termed prospective renters or tenants, one of which is indicated at 14. The rental system 10 utilizes a communications network 16 to enable a prospective customer to communicate with a rental manager or coordinator 18 located at a remote business management office 20. In the illustrated embodiment, the prospective customer 14 may enter a customer service area 22 preferably situated closely proximate the self-storage facility, and discuss self storage needs with the remote rental manager 18. As used herein, self-storage refers to facilities offering individual storage units, such as depicted at 28, for rent on a periodic basis, such as month-to-month or longer, and wherein each storage unit has a separate entrance door to enable the customer or renter to lock the door and essentially have sole access to the rented unit.

Figure 2:
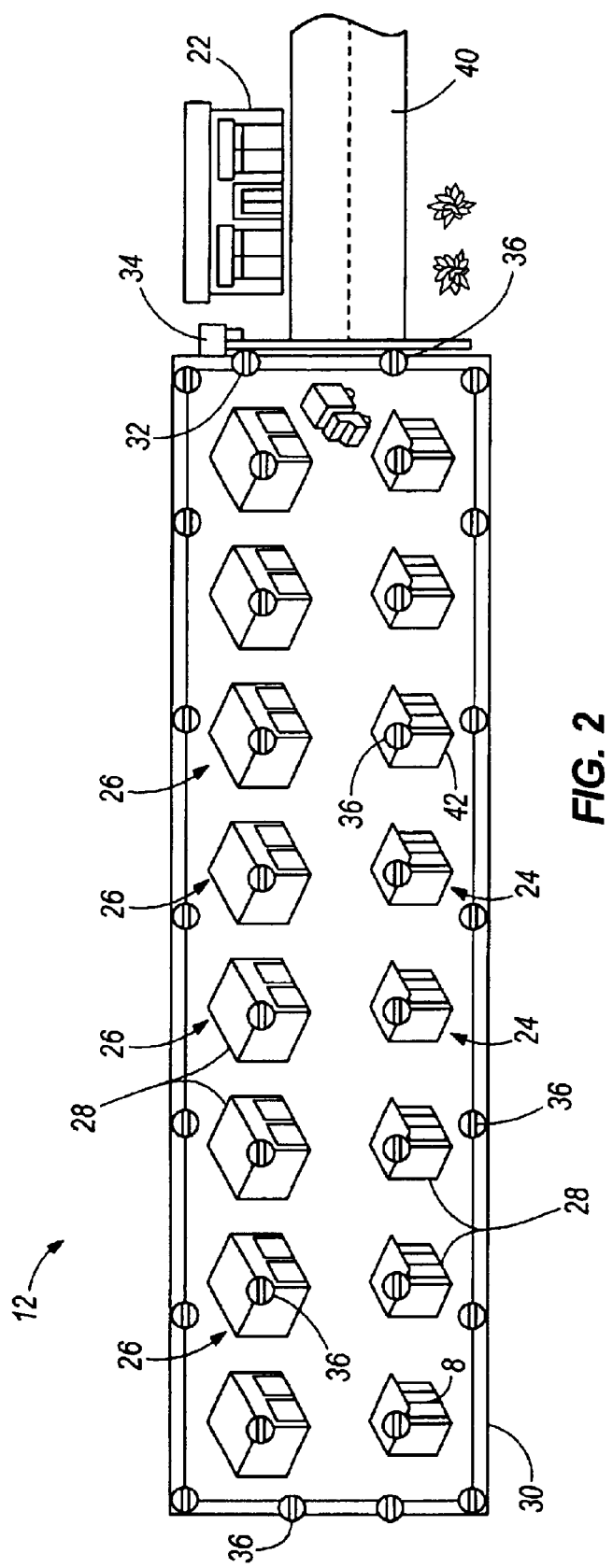
FIG. 2 schematically illustrates a self-storage facility and customer service site of the type that may be used in the system of FIG. 1.

As illustrated in FIG. 2, a typical self-storage facility 10 may comprise one or more single or multiple level buildings, such as indicated at 24 and 26, respectively, each of which has a plurality of discrete rental storage units 28 of various sizes. The rental units 28 may be surrounded by a wall or security fence as indicated at 30 in FIG. 2. Each storage unit 28 has its own access door, such as a standard or oversize hinged door or a roll-up door. The typical self-storage facility 10 may also offer secure storage for boats and motor vehicles. Each self-storage unit 28 also preferably has interior lighting and may be climate controlled and include other features, as is known.

In the illustrated embodiment, the customer service area 22 is preferably, although not necessarily, located in close proximity to the self-storage units 12. A prospective renter or customer 14 may enter the customer service area 22, interact with the remote manager and receive rental information. If the self-storage units 12 are surrounded by a security wall or fence 30 having an access gate 34, the remote manager can direct the prospective customer to exit the customer service area for inspecting one or more available self-storage rental units 28. As the prospective customer approaches the secured self-storage units 12, a camera 32 is positioned to allow the remote manager 18 to observe the customer approaching an access gate 34. The manager can activate the access gate 34 to permit the customer to enter the self-storage facility. If desired, a number of security cameras 36 may be strategically positioned about the self-storage unit 12 to enable the remote manager to monitor the grounds for security purposes.

Figure 7:
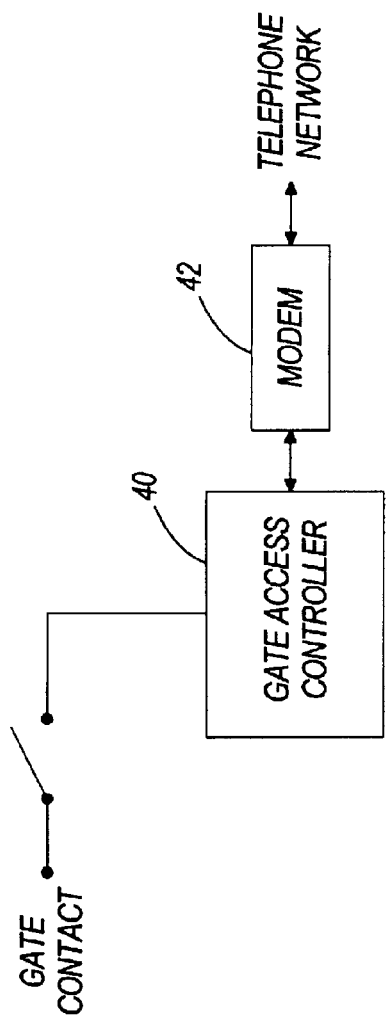
FIG. 7 schematically illustrates a gate control for use with the self-storage facility of FIG. 2 to enable a prospective customer to inspect one or more available rental units.

FIG. 7 schematically illustrates access gate control circuitry for allowing a customer 14 to enter the area of the secured self-storage units 12. When a customer 14 arrives at the self-storage facility and orally interacts with the remote manager 18, in a manner to be described, about renting a rental unit 28, the manager sends a signal to a gate access controller 40 by utilizing the communications network 16. The manager 18 sends a signal over the telephone network to a modem 42 which interfaces with the gate access controller 40. Alternatively, the customer 14 may contact the remote manager 18 by activating a push button located near the access gate 34. The push button effects communication with the manager 18 at the remote management site 20 and lets the manager decide whether the access gate 34 should be opened. In an alternative embodiment of the interactive self-storage rental system 10, the customer service area 22 may be located in an area removed from the self-storage units 12, such as a strip mall, shopping center, or other remote facility that is preferably within a convenient driving distance from the self-storage units. If desired, the management site 20 may also be located in the same area as the self-storage units 12. Whether located a remote distance from the self-storage units 12, or closely proximate the self-storage units, the management site 20 preferably is operative to communicate with and manage a number of self-storage facilities.

The communications network 16 allows for audio, video, and multimedia transmission of information between the customer service area 22 at the self-storage units 12 and the remote management site 20. The communications network 16 enables customers and managers to communicate across multiple access channels, including telephone, Internet, radio, cellular, satellite, cable, facsimile, email, web and video. Alternatively, the communications network 16 may utilize public switch telephone network (PSTN) to effectuate a telephonic connection between the customer 14 and the remote manager 18. Communication between the manager 18 and the customer 14 may also be effectuated in other ways known in the communications art. The communications network 16 is operative to carry information relating to the interactive self-storage rental system 10. For example, video images of the self-storage units 12 and the customer service area 22 may be transmitted to the remote manager 18. Audio (e.g. voice) communication from the manager 18 may be transmitted to the prospective customer 14 at the customer service area 22 or at the storage units 12.

While the interactive self-storage rental system 10 has been described with reference to communications initiated by the prospective customer 14, it will be understood that communication may also be initiated by the remote manager 18. For example, the manager 18 may initiate a conversation with a customer 14 when the customer enters the self-storage facility 10.

Figure 3:
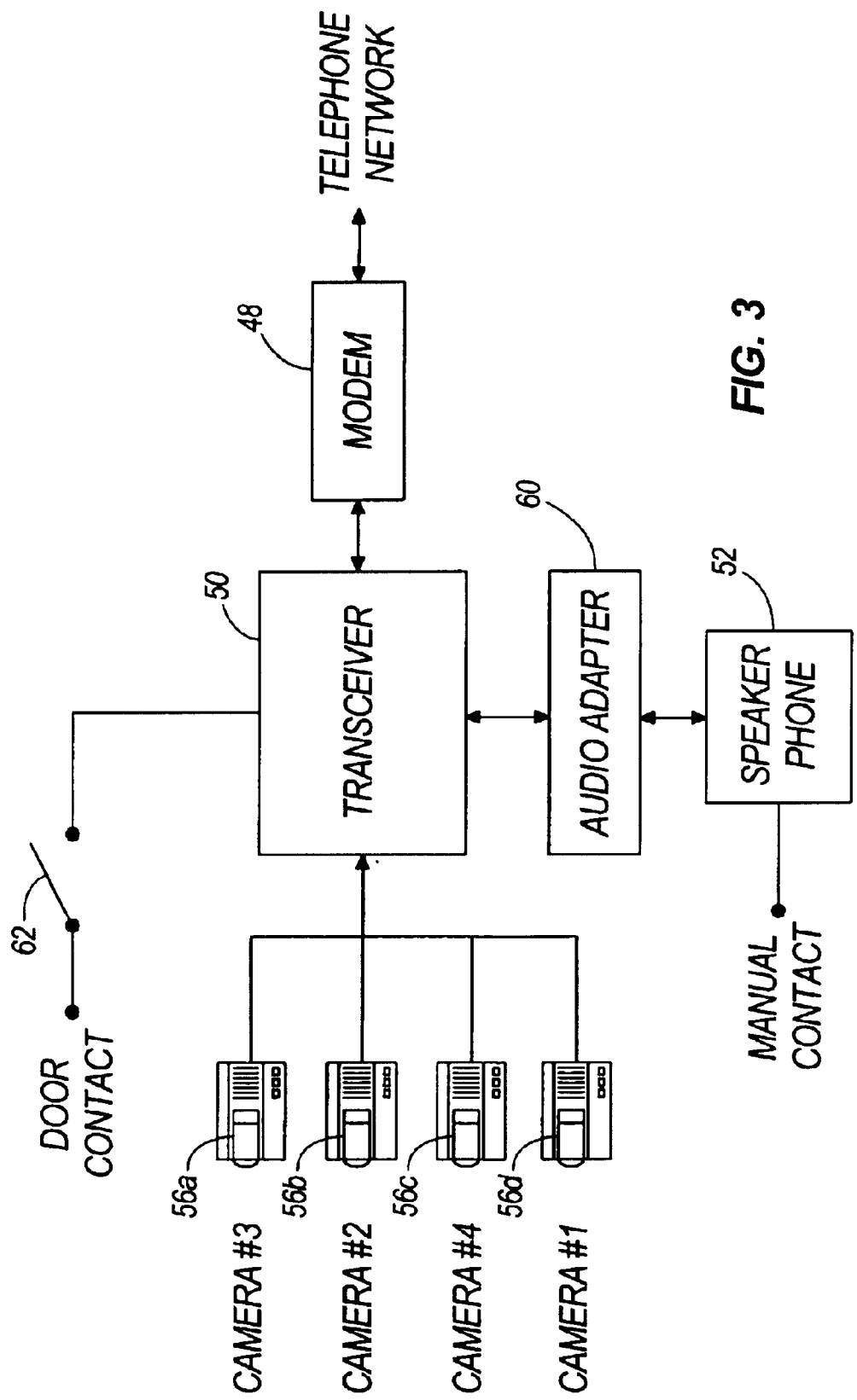
FIG. 3 schematically illustrates one embodiment of audio and video equipment that may be used in the system of FIG. 1.

The customer service area 22 includes hardware and software necessary for facilitating self-storage rentals, such as customer detection hardware, audio visual equipment, and a specially designed customer service countertop 44 located within the customer service area. FIG. 3 schematically depicts a customer detection circuit for recognizing when a customer 14 enters the customer service area 22. When a prospective customer arrives at the customer service area 22 and opens a door, indicated at 62 in FIG. 4, to enter the service area, a switch 46 in the customer detection circuit is activated, i.e. closed, to automatically initiate dialing a telephone number to connect with the remote manager 18. The appropriate telephone number is dialed by a modem 48 of a transceiver 50 to initiate communication. Alternatively, the customer 14 may contact the remote manager 18 by activating a push button 52a located on a speakerphone 52 at the customer service area 22. In another alternative, a prospective customer may pick up a telephone receiver located at the customer service area 22 to initiate communication with the remote manager. In the latter embodiment, picking up the telephone receiver automatically dials the manager at the remote management site 20. In another alternative, the remote manager 18 may control the customer services area door 62 by sending a signal to the transceiver 50, as is known. For example, the manager 18 may not want to allow flex hours entry to the customer service area 22 and may keep the door to the service area locked at certain times to prevent entry of a prospective customer.

Figure 4:
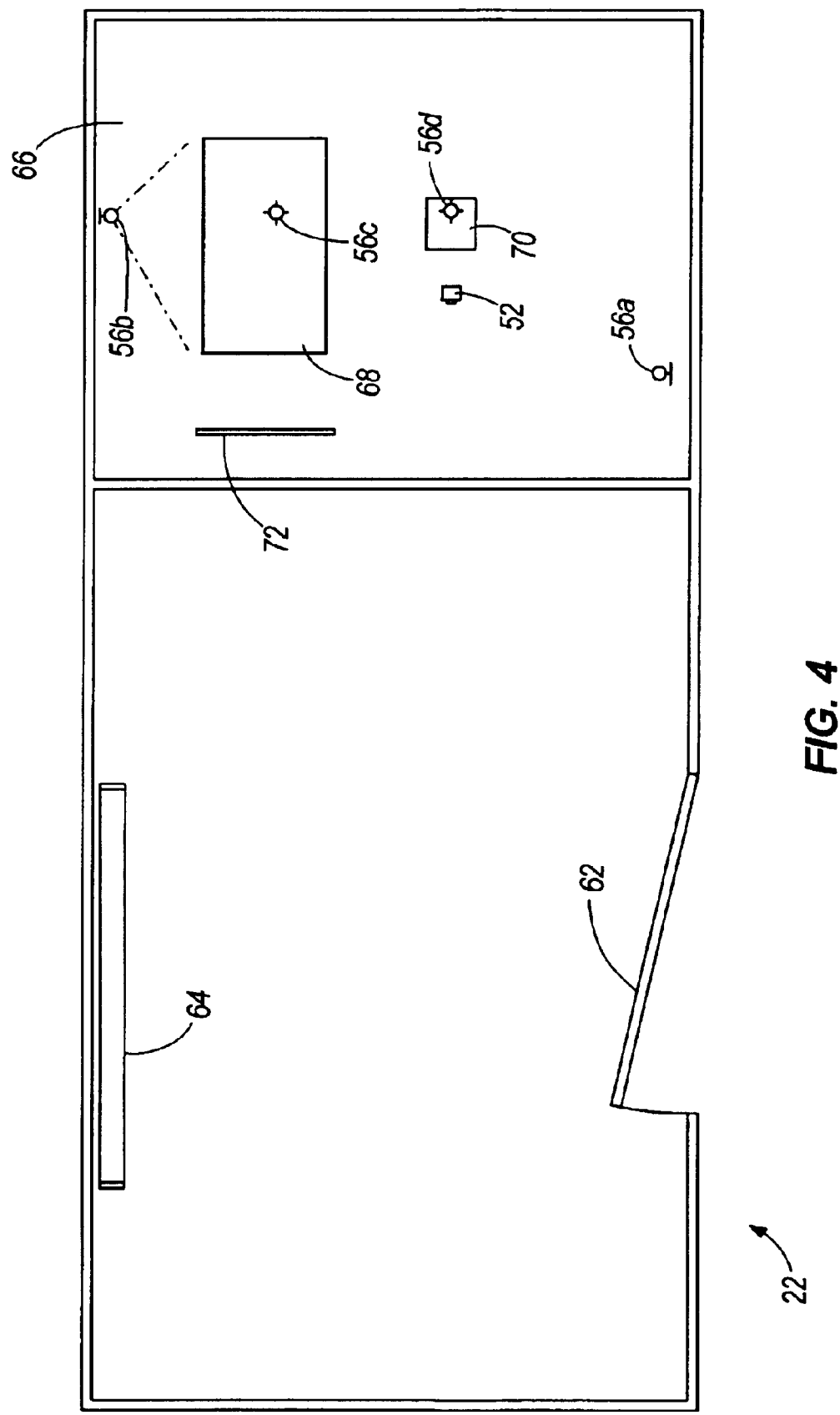
FIG. 4 is a schematic plan view of a customer service area to be entered by a prospective customer for interaction with a remote manager of the interactive self-storage rental system of FIG. 1.

The customer service area 22 also includes audio visual equipment to allow the manager 18 at the remote management site 20 to visually communicate with the customer 14 at the customer service area 22. As shown in FIGS. 3 and 4, cameras 56a–d provide visual input of the customer service area 22 to the manager at the remote management site 20. The speakerphone 52 provides audio feedback so that the customer 14 may communicate with the manager 18. Alternatively, the customer service area 22 may be equipped with a computer system to enhance communication between the remote manager 18 and prospective customer. For example, the customer service area 22 may include a scanner and laser printer for communication. The scanner may be used to read credit card information, a rental agreement, or other information that a customer may want to communicate to the manager. The laser printer may also be used to print a receipt or provide information that the manager 18 wishes to have the customer read.

In operation, visual information from the cameras 56a–d is sent to the remote manager 18 via the telephone network by utilizing the transceiver 50. The transceiver 50 transmits and receives visual information between a modem 58 and the cameras 56a–d. The transceiver 50 also transmits and receives audio information from the speakerphone 52 via an audio adapter 60 and the modem 58. The transceiver 50 also transmits and receives door contact information from the customer service area door 62 and the modem 58. The transceiver 50 may comprise a model DV-202 commercially available from Telesite USA, Inc; the audio adapter 60 may comprise a model AOP-XD commercially available from Louroe Electronics, Inc.; and the speakerphone 52 may comprise an AOP-SP/P8 manufactured by Louroe Electronics, Inc. It will be understood that various alternative hardware and software components may be utilized in place of the aforedescribed hardware.

FIG. 4 schematically depicts a floor plan for the customer service area 22 that includes the door 62, a business name placard 64, and a customer service countertop 66 that may include associated cabinetry (not shown). The door 62 is preferably operative to signal the presence of a customer 14 when opened as aforedescribed. The business name placard 64 may present the name of the interactive self-storage rental business entity. The countertop 66 and associated cabinetry serve to house the audio visual equipment that facilitates communication between a prospective customer and the remote manager 18.

The customer service area countertop 66 supports a speakerphone 52 and has two specific rectangular outlined areas 68 and 70 identified at different heights of the countertop surface. The countertop 66 also has a rental agreement deposit slot 72 and supports the cameras 56a–d in strategic positions, as will become apparent. The speakerphone 52 allows for audio communication between the prospective customer and the remote manager. The rectangular area 68 on the countertop 66 is termed the "rental agreement area" and functions to allow the manager 18 to view information, such as on a rental agreement, when positioned in area 68. Cameras 56b and 56c are positioned to facilitate remote viewing of the rental agreement area 68 and enable the remote manager to observe all areas of the rental agreement that must be filled out and signed by the customer. The camera 56c allows magnified viewing of specific details on a rental agreement place on surface 68. The second outlined area 70 on the countertop 66 is termed "payment identification area" and functions to allow the remote manager to view payment information, e.g. a customer's credit card or a bank check. Camera 56d is positioned for use in viewing of the payment and identification area 70. The manager may ask the prospective customer to place other information, such as a driver's license or state identification card on the outlined area 70 of the countertop 66 to be viewed by the remote manager via camera 56d. In addition, camera 56a may be used to view the customer 14 in the customer service area 22 and confirm proper insertion of a completed rental agreement and payment into the deposit slot 72 for later collection by the manager 18.

Figure 5:
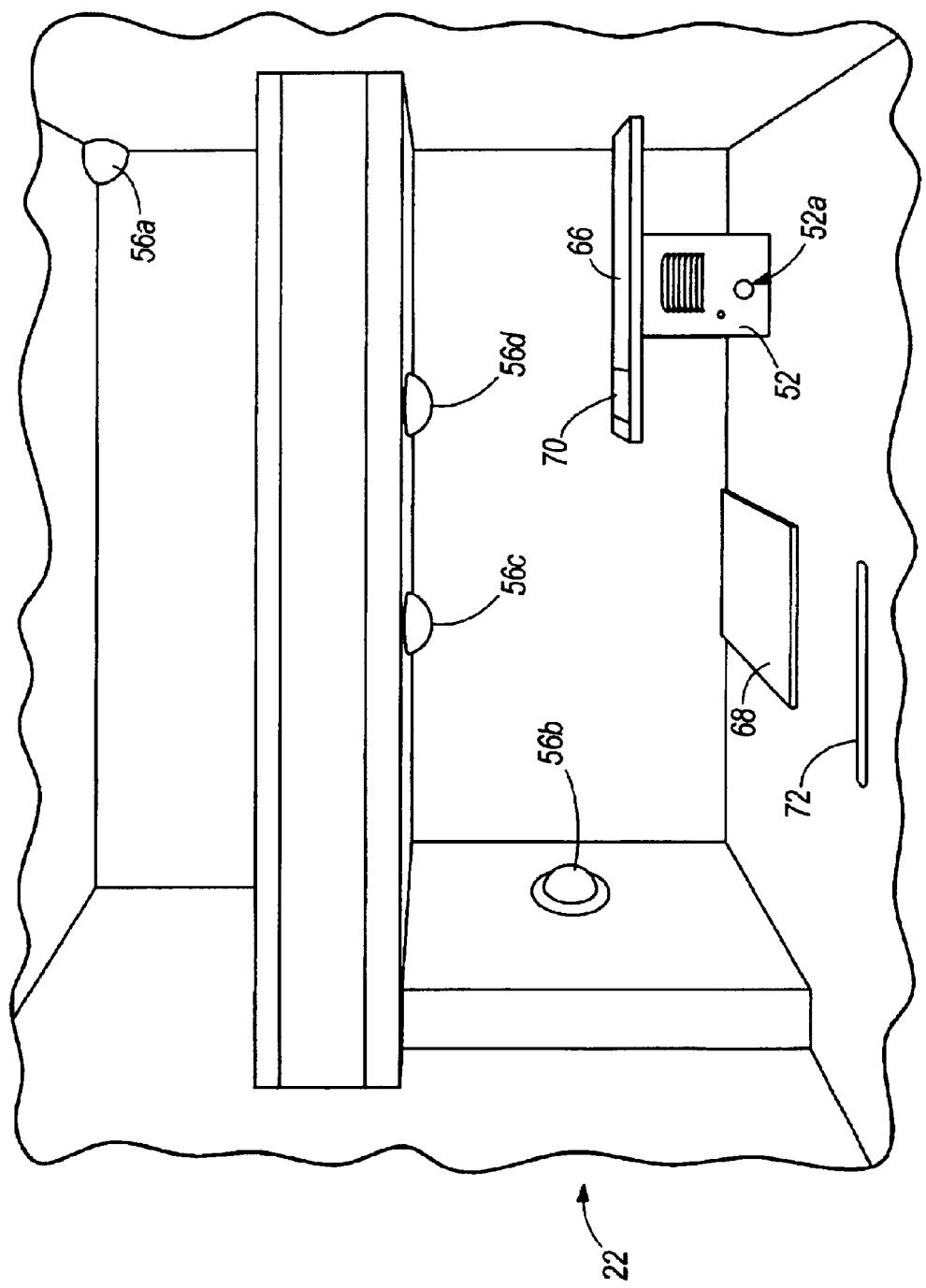
FIG. 5 is a fragmentary perspective view illustrating a countertop and associated components utilized in the customer service area of FIG. 4 to facilitate completion of a rental agreement with the assistance of the remote manager.

FIG. 5 is a fragmentary elevational perspective of the customer service area 22 and countertop 66. The customer service countertop 66 area is lighted and climate controlled, and is preferably painted a dark color to minimize glare in transmitted video. Further, the customer service countertop 66 may include milky white lights to minimize glare in transmitted video. The countertop 66 may house the transceiver 50, audio adapter 60, modem 58, and other audio visual equipment.

Figure 6:
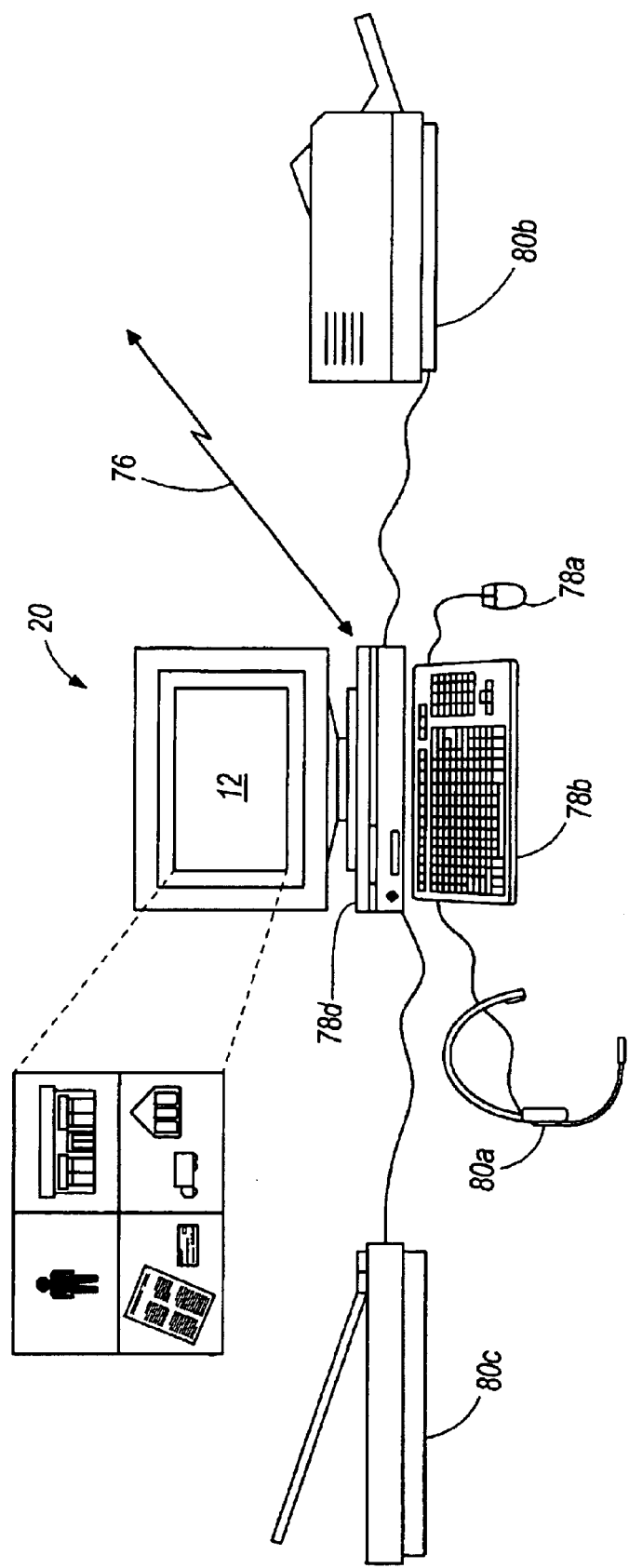
FIG. 6 schematically illustrates various components provided on a customer service area countertop of FIG. 5 to facilitate interaction between a prospective customer and the remote rental manager or coordinator.

Referring to FIG. 6, the management site 20 includes a computer system 76 that enables communications with the customer service area 22 and the self-storage facility 12. The computer system 76 comprises a personal desktop computer including a monitor 78a, a keyboard 78b, a mouse 78c, a CPU 78d having random access memory (RAM), storage in the form of a hard disk, and network access to the communications network 16. The computer system 76 may also include a headset 80a, a laser printer 80b, and scanner 80c. The headset 80a may be used for audio communications with the customer 14. The computer system 20 may also include a floppy disk, a CD-ROM drive, read-only-memory, and a modem, as is known. The interactive self-storage rental system 10 may utilize computer operating software currently available on a number of platforms, such as Microsoft Windows®, Apple MacOS® and Sun Solaris®. The self-storage rental system 10 could also be implemented as an operating system of its own on computing platforms that may emerge in the future. The computer system 76 may run Windows 98, Windows NT, or equivalent, Palm OS, WindowsCE, or equivalent, or an operating system used on Apple or Sun Computers, it being understood that the interactive self-storage rental system 10 is not limited to a particular operating system or computer system to operate in accordance with the subject invention. The computer system 76 may be provided with software loaded from floppy disks, from a CD-ROM, over a network, or from any other suitable storage media. In addition to a personal computer, communication between the prospective customer and the remote manager of the interactive self-storage rental system 10 could be effected over the Internet.

In operation, and referring to FIGS. 1 and 6, the monitor 78a of the computer system 76 allows the remote manager 18 to view the customer service area 22, information in the rental agreement area 68 on the countertop 66, information in the payment/identification area 70, and the gate area of self-storage facility 12 at the same time. Further, the computer system 76 allows the manager to change what is being viewed. For example, when a prospective customer is not present in the customer service area 22, the manager may, with the addition of a multiplexer, wish to view the storage unit premises through security cameras 36 located at the self-storage facility 12.

Figure 8:
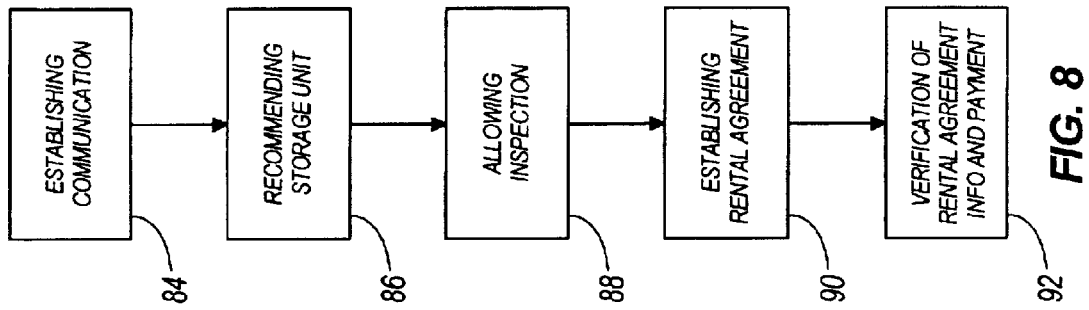
FIG. 8 is a flow chart diagrammatically illustrating an interactive self-storage rental method in accordance with one embodiment of the present invention.

As illustrated in block diagram format in FIG. 8, the interactive self-storage rental system 10 in accordance with the invention enables a potential customer or renter of a storage unit to establish communication with the remote manager 18 (represented by block 84). The remote manager can then view the customer through camera 32, enable entry into the customer service area 22 and then similarly interact with the customer both verbally and by one or more of the cameras 56*a*–*d*. The manager can describe and recommend a storage unit that will meet the needs of the customer (block 86), and facilitate inspection of one or more storage units (as represented by block 88). Each rental unit has a number of rental agreement forms kept within the unit. If the prospective customer wishes to rent one of the inspected storage units, the customer takes a rental agreement from the selected storage unit that has specific information regarding the selected unit imprinted on the agreement and returns to the service area 22. In the illustrative embodiment, communication between the customer and remote manager is again established via the PSTN to enable telephone conversation. The remote manager 18 can then guide and assist the customer in completing a rental agreement when disposed within the area 68 on the countertop 66 (represented by block 90), and can verify payment and supporting identification documents placed on the viewing area 70 of the countertop (represented by block 92).

As aforedescribed, communication between a prospective customer and the remote rental manager 18 may be effected when a customer opens the door 62 to the customer service area 22 and enters the customer service area. A door contact is closed when the door 62 is opened and signals the computer system 76 at the customer service area 22 to automatically dial a telephone number to establish both audio and visual (camera) connection with the manager 18 at the remote management site 20. The computer system 76 at the management site 20 may be equipped with a sound card to alert the manager to the presence of the prospective customer at the service area 22. Alternatively, the customer may manually place a telephone call to the remote manager by pushing a button on the speakerphone 52 at the customer service area 22. In a further alternative, the customer may use a telephone at the customer service area to automatically dial the manager at the remote management site 20.

Prior to the manager 18 recommending a particular size storage unit 12, the prospective customer may discuss his/her self storage needs with the manager and inquire about the types of storage units available. Again, discussion of the customer's needs may occur over a voice transmission line utilizing speakers and a telephone connection, and may also entail transmission of information via video cameras. For example, a customer may wish to show the manager a picture of an article he/she wishes to store, such as a picture of a boat or other relatively large article. This can be accomplished by placing the picture in the rental agreement area 68 on the customer service countertop 66. The manager may, if necessary, utilize a software application to help determine and recommend one or more different size storage units that will meet the customer's needs.

In facilitating inspection by the customer of one or more recommended available storage units, the manager 18 may direct the customer to specific numbered self-storage units by activating an opener for the computer controlled access gate 34 to the secured area of the storage facility 12. The manager may view the customer's movements through at least one of the security cameras 36 at the self-storage facility 12. The customer 14 may then look at the recommended available rental units and decide which one he/she wishes to rent. If the prospective customer wishes to rent one of the recommended self-storage units, the customer may speak through the speakerphone 52 in the service area 22 and tell the remote manager which of the inspected units he/she wishes to rent. If none of the inspected storage units are found to be adequate, the manager may direct the customer to another available self-storage unit that may be more acceptable to the customer.

As aforedescribed, when the customer has selected one of the inspected storage units for rental, he/she removes a lease agreement from the selected unit that has identifying data concerning the selected unit imprinted on the agreement. The customer then returns to the customer service area 22 to complete the rental agreement form under the guidance of the remote manager. Upon opening the door 62 to the customer service area 22, the remote manager is again alerted and can explain over the speakerphone what the customer is to do next.

The customer then fills out the tenant information section of the rental agreement, signs the agreement, and initials in the margin key paragraphs when necessary to confirm acceptance of these paragraphs by local law. The customer will also be asked what form of payment he/she wishes to use. If by credit card, the customer may be asked to insert credit card information within a designated area on the lease agreement. If the customer plans to store a vehicle, he/she may be asked to fill in the vehicle identification number (VIN). The customer will also be given a rent due date, if not already indicated in the rental agreement, and asked to insert the date in a designated place on the agreement. The manager then instructs the customer to place the lease agreement in the designated area 68 on the countertop 66. The lease agreement is designed to require that the customer's personal information be inserted in specific areas of the agreement and other areas initialed by the customer so as to allow the two cameras 56*b* and 56*c* to focus in on the key areas of the agreement.

In identifying and confirming information provided by the customer, such as personal identification and credit card or check information placed on area 70, camera 56*d* (including specially selected lens and neutral light filter) is strategically placed to allow the remote manager to view and confirm that the name(s), address(es), phone number(s), credit card numbers, personal checks, driver license numbers or other written information placed on area 70 for viewing by the remote manager through camera 56*d* conforms to the corresponding identifying data inserted by the customer on the rental agreement. Camera 56*d* also allows the manager to compare the photo on a customer photo-bearing identification with the actual prospective customer who may be instructed to peer into camera 56*a*. It also allows the manager to confirm that the customer has not changed rental information management has previously written or imprinted on the lease agreement form regarding the storage unit rented. The manager can also verify that the customer's credit card is valid by running a manually inputted authorization check to the credit card company. The manager can interactively use the speakerphone part of the audio/video system to ask any questions to clarify such information. The manager may also photocopy the viewed customer identifying documents via CS130 software. The camera 56*b* allows the remote manager to verify each paragraph in the rental agreement that must be initialed by the customer if such initialing is required by local law. If the rental agreement has been correctly completed, the remote manager will issue an access code to be inserted on the agreement. He will advise the customer to remove his/her identification and payment documents from the countertop area 70, remove a yellow carbon copy of the agreement for his/her records, and insert the original signature agreement along with a check, if payment is made by check, into the deposit slot 72 for later retrieving by the manager. The customers completion of these instructions can be viewed by the manager via camera 56*a*.

Preferably, a merchandise cabinet is provided within the customer service area 22 that contains merchandise, such as locks for locking the doors to the storage units, that the customer may wish to purchase. The remote manager may ask the customer if he/she wishes to purchase a lock or other merchandise in the cabinet. If so, the manager can enable access to the merchandise cabinet and verify that proper selected merchandise has been removed through the observation camera 56a. The manager can then tell the customer the price due for the merchandise selected.

Figure 9A:
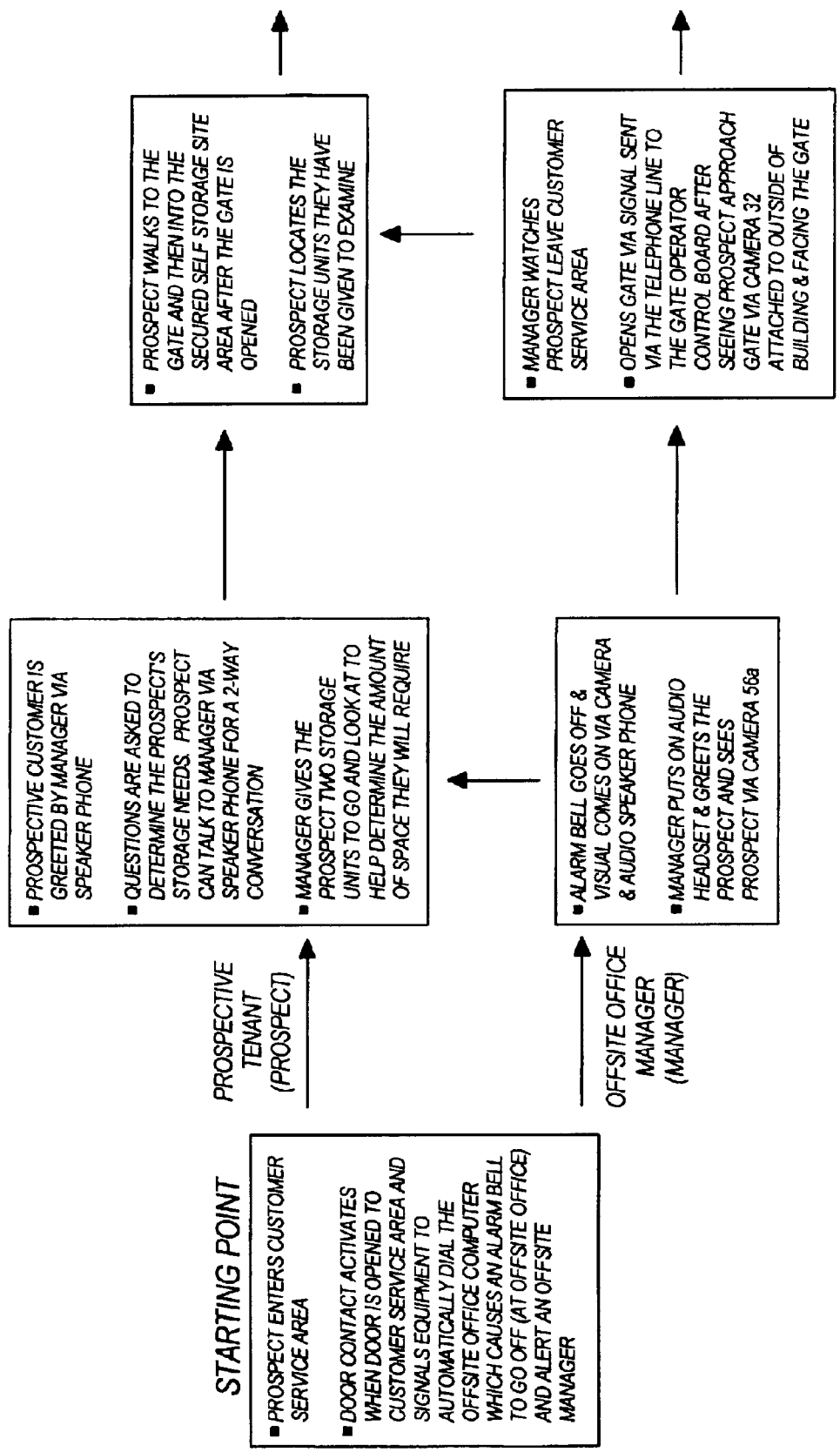
FIGS. 9A–9C are flow charts showing in greater detail the various steps undertaken in renting a self-storage unit to a prospective customer by a remote manager in accordance with a preferred embodiment of the invention.
Figure 9B:
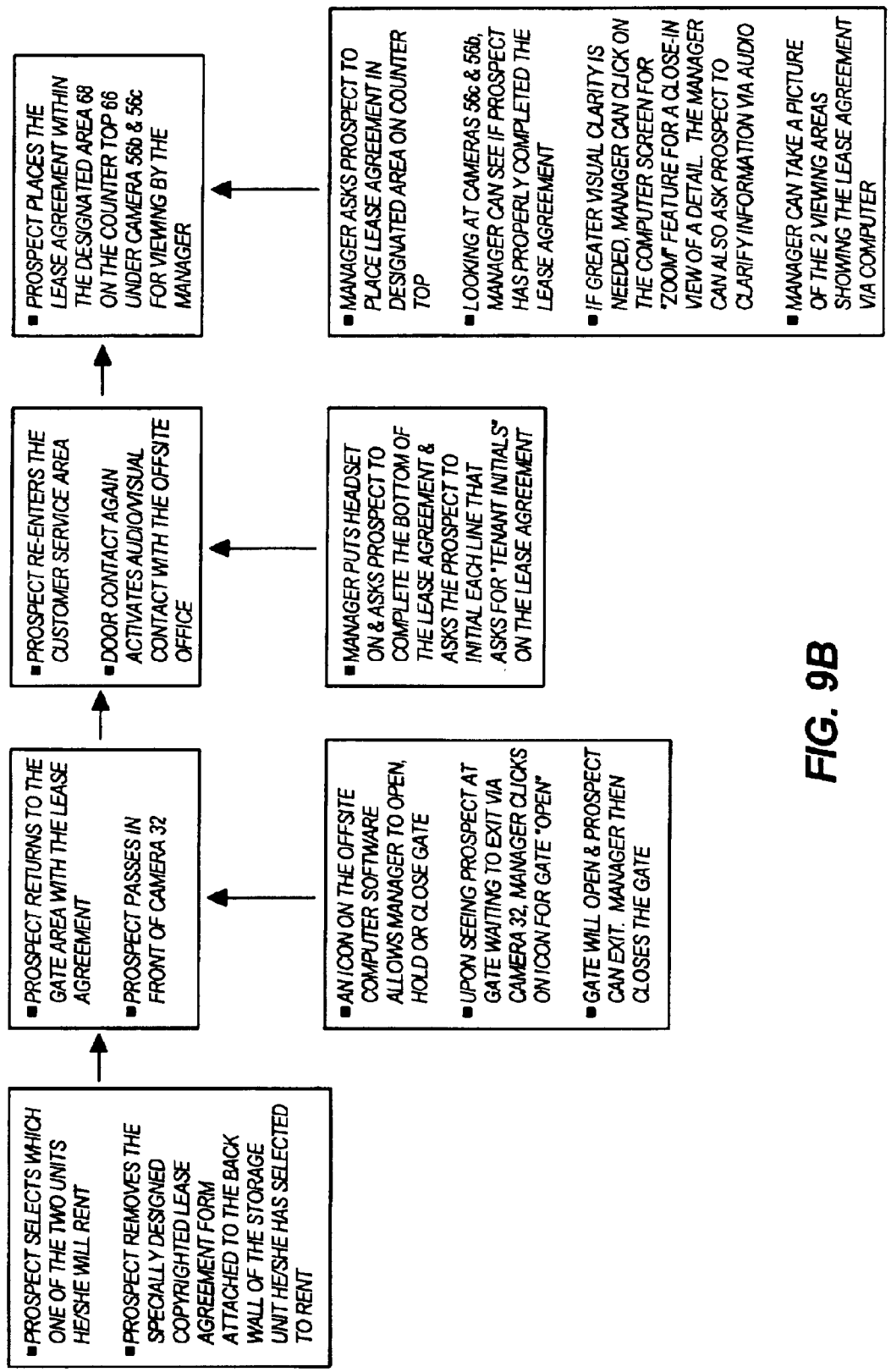
Figure 9C:
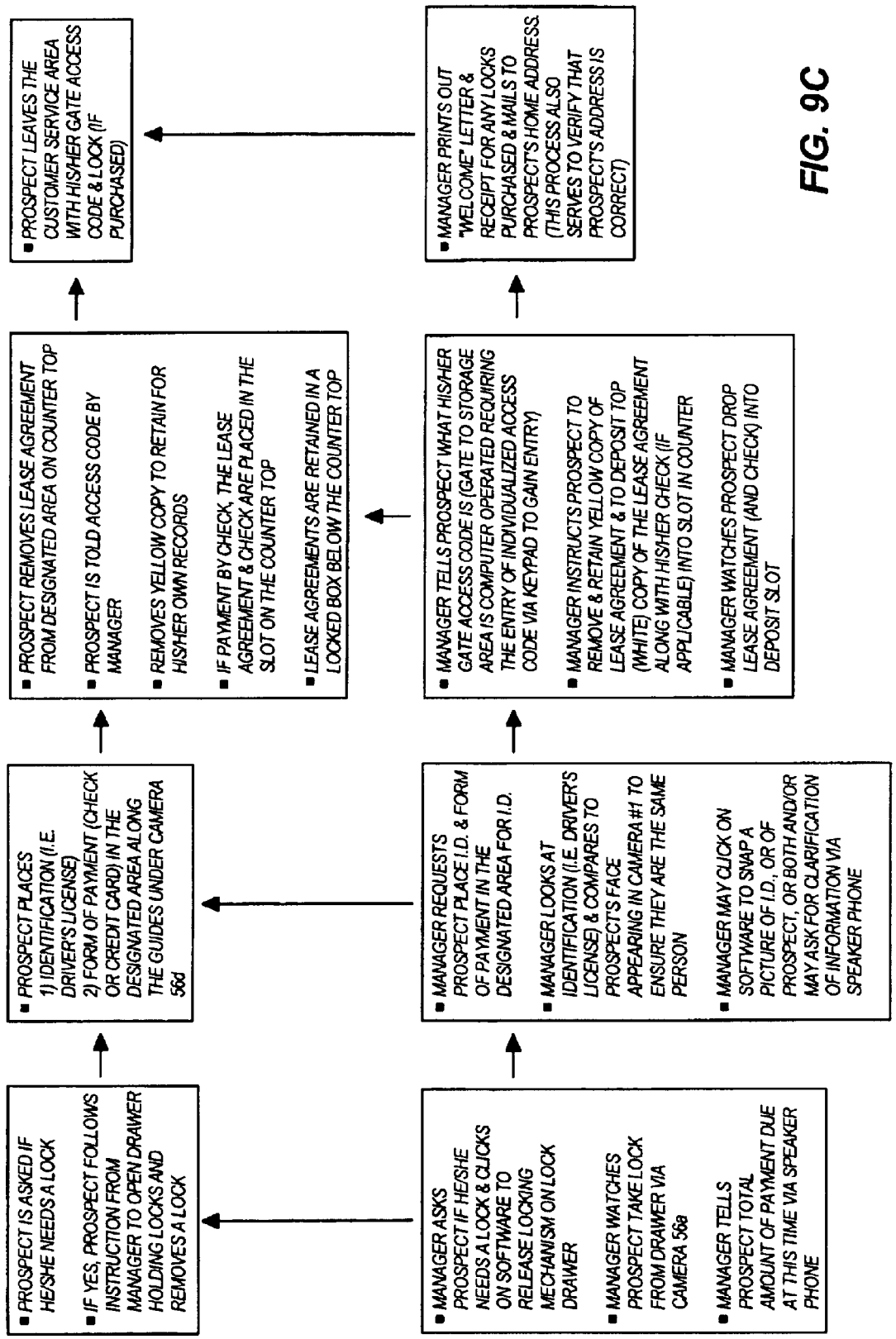

FIGS. 9A–9C summarize in a flow chart format the various steps and functions carried out in renting a self-storage unit in accordance with a preferred embodiment of the invention. The system eliminates the need for a customer to read a computer menu, read instructions, or push correct buttons, thus allowing easy use of the rental system by a non-technically trained customer who is relatively unskilled in computer operation. By automatically establishing interactive communication with a remote system manager, a customer need only to respond to questions and directions received for the remote manager that do not require special knowledge or skills on the part of the customer.

While preferred embodiments of the self-storage rental system in accordance with the invention have been illustrated and described, it will be understood to those skilled in the art that changes, modifications and additional implementations may be made to the invention without departing from the invention in its broader aspects. Various features of the invention are defined in the following claims.

What is claimed is:

1. A method for renting to a customer a self-storage unit located at a self-storage facility, said method adapted to facilitate transactions with customers including customers who lack appreciable skills in computer operation, said method adapted to enable customers to respond to questions and instructions not requiring specialized knowledge or skills on the part of the customers, said method comprising the steps of:

providing a customer service area including a customer service counter, the customer service counter having a rental agreement viewing area which is viewed by at least one camera positioned in the customer service area, the customer service counter being configured to minimize glare in images captured by the at least one camera, at least one image captured by the at least one camera being viewable by a remote manager, the remote manager being a person who is remote from the customer service counter, the customer service area being independent of a computer-generated customer menu interface and manipulable customer input buttons;

establishing voice communication between the remote manager and a customer entering the customer service area using a communication link so that the customer and the remote manager can orally communicate using the communication link, wherein the customer can orally communicate to the remote manager through the communication link an indication of the storage needs of the customer, and wherein the remote manager can orally communicate to the customer through the communication link a recommended self-storage unit;

providing an access controller by which the remote manager can remotely provide the customer access to the recommended self-storage unit so the customer can inspect the recommended self-storage unit; and providing the customer a hardcopy rental agreement form having at least a portion to be filled out manually with inserted data by the customer, as directed by the remote manager, at least some of the inserted data being verifiable by the remote manager with the output of the at least one camera, at least one image captured by the at least one camera allowing the remote manager to view an image of the hardcopy rental agreement placed on the rental agreement viewing area.

2. The method of claim 1 wherein the step of establishing voice communication between the remote manager and the customer includes the step of automatically telephoning the remote manager when the customer activates a customer service area door contact by entering the customer service area through a door.

3. The method of claim 1 wherein the step of establishing voice communication between the remote manager and the customer includes the step of automatically effecting voice communication between the remote manager and the customer in response to the customer entering the customer service area.

4. The method of claim 1 wherein the step of establishing voice communication between the remote manager and the customer includes the step of automatically telephoning the remote manager when the customer picks up a telephone receiver disposed within the customer service area.

5. The method of claim 1 wherein the remote manager identifies a self-storage unit which can accommodate the storage needs of the customer, and the remote manager recommends to the customer a self-storage unit within the self-storage facility that can accommodate the storage needs of the customer.

6. The method of claim 1 wherein, with the access controller, the remote manager can selectively remotely open an access gate to allow the customer access to and egress from the self-storage unit.

7. The method of claim 6, wherein an image of the customer is viewable by the remote manager with an on-site camera as the customer approaches the access gate.

8. The method of claim 1 wherein the hardcopy rental agreement form includes pre-printed self-storage unit identification information.

9. The method of claim 1 wherein at least one image of the customer, generated by a camera positioned in at least one of the customer service area and the self-storage facility, is viewable by the remote manager to observe the customer.

10. The method of claim 1 wherein at least some of the self-storage units are viewable by the remote manager with a camera positioned in at least one of the customer service area and the self-storage facility.

11. The method of claim 1 wherein the customer service area includes a merchandise cabinet having merchandise therein of possible interest to the customer, and further comprising the step of providing a cabinet access controller by which the remote manager can selectively remotely unlock the merchandise cabinet to allow the customer access to at least some of the merchandise.

12. The method of claim 1 wherein the customer service area includes a door, and further comprising the step of providing a door access controller by which the remote manager can selectively remotely lock the door to limit entry into the customer service area.

13. The method of claim 1 wherein the inserted data includes personal data and payment data, and wherein information corresponding to at least some of the inserted data and provided by the customer is verifiable, by the remote manager, with a camera positioned in the customer service area.

14. The method of claim 1 wherein the customer service counter includes a second viewing area for placement of at least personal identification information and payment information by the customer, the personal identification information including a customer photo-bearing identification card, the payment information including credit card or check information, wherein the second viewing area is viewed by at least one associated camera positioned in the customer service area and adapted to provide clearly defined images of the personal identification information and payment information, the second viewing area being distinct from the rental agreement viewing area, wherein the at least one associated camera allows the remote manager to view an image of the second viewing area from the remote location, wherein the inserted data in the hardcopy rental agreement includes personal data and payment data corresponding at least in part to the information in the second viewing area, and wherein the remote manager can verify correctness of the inserted data in the hardcopy rental agreement by viewing at least one image of the second viewing area captured by the at least one associated camera and comparing information in the at least one image with the corresponding data inserted by the customer in the hardcopy rental agreement.

15. The method of claim 14 wherein the at least one associated camera of the second viewing area includes a selected lens and neutral light filter.

16. The method of claim 1 wherein the customer service counter is painted a dark color to minimize glare.

17. The method of claim 1 wherein the customer service counter is illuminated with milky white lights to minimize glare.

18. The method of claim 1 and further comprising the step of providing a rental agreement drop box for depositing completed hardcopy rental agreement forms, wherein the customer can insert a completed hardcopy rental agreement form in the drop box.

* * * * *